(12) United States Patent
Paolini, Jr. et al.

(10) Patent No.: US 10,551,713 B2
(45) Date of Patent: *Feb. 4, 2020

(54) ELECTRO-OPTIC DISPLAYS, AND METHODS FOR DRIVING SAME

(71) Applicant: E INK CORPORATION, Billerica, MA (US)

(72) Inventors: Richard J. Paolini, Jr., Framingham, MA (US); Stephen Bull, Windham, NH (US); Seth J. Bishop, Framingham, MA (US); Karl Raymond Amundson, Cambridge, MA (US); Stephen J. Telfer, Arlington, MA (US); George G. Harris, Woburn, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,030

(22) Filed: Dec. 20, 2018

(65) Prior Publication Data
US 2019/0121215 A1  Apr. 25, 2019

Related U.S. Application Data

(63) Continuation of application No. 15/852,807, filed on Dec. 22, 2017, now Pat. No. 10,197,883, which is a
(Continued)

(51) Int. Cl.
*G02F 1/167* (2019.01)
*G02F 1/1362* (2006.01)
(Continued)

(52) U.S. Cl.
CPC .......... *G02F 1/167* (2013.01); *G02F 1/13439* (2013.01); *G02F 1/136286* (2013.01);
(Continued)

(58) Field of Classification Search
None
See application file for complete search history.

(56) References Cited

U.S. PATENT DOCUMENTS 3,679,967 A   7/1972  Staker
4,418,346 A  11/1983  Batchelder
(Continued)

FOREIGN PATENT DOCUMENTS

JP   2005208493 A    8/2005
JP   2011257659 A   12/2011
(Continued)

OTHER PUBLICATIONS

Wood, D., "An Electrochromic Renaissance?" Information Display, 18(3), 24 (Mar. 2002).
(Continued)

*Primary Examiner* — Carl Adams
(74) *Attorney, Agent, or Firm* — William John Keyes

(57) ABSTRACT

A first display includes a layer of electro-optic material with first and second electrodes on opposed sides thereof. One or both electrodes have at least two spaced contacts. Voltage control means are arranged to vary the potential difference between the two spaced contacts attached to the same electrode. A second display includes a layer of electro-optic material with a sequence of at least three electrodes adjacent thereto. Voltage control means vary the potential difference between the first and last electrodes of the sequence. The electrodes of the sequence alternate between two surfaces of the layer of electro-optic material, and have edges that overlap or lie adjacent the preceding and following electrodes of the sequence. The electrodes, other than the first and last, are electrically isolated such that the potential
(Continued)

thereof is controlled by passage of current through the layer of electro-optic material. Methods for driving these displays are also provided.

18 Claims, 10 Drawing Sheets

Related U.S. Application Data continuation-in-part of application No. 14/987,850, filed on Jan. 5, 2016.

(60) Provisional application No. 62/100,031, filed on Jan. 5, 2015.

(51) Int. Cl.
G02F 1/1343 (2006.01)
G02F 1/155 (2006.01)
G02F 1/1368 (2006.01)
G02F 1/1676 (2019.01)
G02F 1/1681 (2019.01)

(52) U.S. Cl.
CPC ............ G02F 1/155 (2013.01); G02F 1/1368 (2013.01); G02F 1/1676 (2019.01); G02F 1/1681 (2019.01); G02F 2001/134318 (2013.01)

(56) References Cited

U.S. PATENT DOCUMENTS

| | | |
|---|---|---|
| 5,218,468 A | 6/1993 | Shaw |
| 5,400,122 A | 3/1995 | Szlucha |
| 5,413,739 A | 5/1995 | Coleman et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II |
| 5,930,026 A | 7/1999 | Jacobson |
| 6,054,071 A | 4/2000 | Mikkelsen, Jr. |
| 6,055,091 A | 4/2000 | Sheridon |
| 6,097,531 A | 8/2000 | Sheridon |
| 6,128,124 A | 10/2000 | Silverman |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,184,856 B1 | 2/2001 | Gordon, II |
| 6,225,971 B1 | 5/2001 | Gordon, II |
| 6,241,921 B1 | 6/2001 | Jacobson |
| 6,271,823 B1 | 8/2001 | Gordon, II |
| 6,301,038 B1 | 10/2001 | Fitzmaurice |
| 6,445,489 B1 | 9/2002 | Jacobson |
| 6,504,524 B1 | 1/2003 | Gates |
| 6,512,354 B2 | 1/2003 | Jacobson |
| 6,531,997 B1 | 3/2003 | Gates |
| D485,294 S | 1/2004 | Albert |
| 6,672,921 B1 | 1/2004 | Liang |
| 6,724,519 B1 | 4/2004 | Comiskey |
| 6,724,521 B2 | 4/2004 | Nakao |
| 6,753,999 B2 | 6/2004 | Zehner |
| 6,788,449 B2 | 9/2004 | Liang |
| 6,825,970 B2 | 11/2004 | Goenaga |
| 6,866,760 B2 | 3/2005 | Paolini, Jr. |
| 6,870,657 B1 | 3/2005 | Fitzmaurice |
| 6,900,851 B2 | 5/2005 | Morrison |
| 6,922,276 B2 | 7/2005 | Zhang |
| 6,950,220 B2 | 9/2005 | Abramson et al. |
| 6,982,178 B2 | 1/2006 | LeCain et al. |
| 6,995,550 B2 | 2/2006 | Jacobson |
| 7,002,728 B2 | 2/2006 | Pullen |
| 7,012,600 B2 | 3/2006 | Zehner |
| 7,012,735 B2 | 3/2006 | Honeyman |
| 7,023,420 B2 | 4/2006 | Comiskey |
| 7,034,783 B2 | 4/2006 | Gates |
| 7,075,502 B1 | 7/2006 | Drzaic |
| 7,116,318 B2 | 10/2006 | Amundson |
| 7,116,466 B2 | 10/2006 | Whitesides |
| 7,119,772 B2 | 10/2006 | Amundson |
| 7,170,670 B2 | 1/2007 | Webber |
| 7,193,625 B2 | 3/2007 | Danner |
| 7,202,847 B2 | 4/2007 | Gates |
| 7,236,291 B2 | 6/2007 | Kaga et al. |
| 7,259,744 B2 | 8/2007 | Arango |
| 7,304,787 B2 | 12/2007 | Whitesides |
| 7,312,784 B2 | 12/2007 | Baucom |
| 7,312,794 B2 | 12/2007 | Zehner |
| 7,321,459 B2 | 1/2008 | Masuda |
| 7,327,511 B2 | 2/2008 | Whitesides |
| 7,339,715 B2 | 3/2008 | Webber |
| 7,365,733 B2 | 4/2008 | Duthaler |
| 7,411,719 B2 | 8/2008 | Paolini, Jr. |
| 7,420,549 B2 | 9/2008 | Jacobson |
| 7,453,445 B2 | 11/2008 | Amundson |
| 7,492,339 B2 | 2/2009 | Amundson |
| 7,528,822 B2 | 5/2009 | Amundson |
| 7,535,624 B2 | 5/2009 | Amundson et al. |
| 7,545,358 B2 | 6/2009 | Gates |
| 7,583,251 B2 | 9/2009 | Arango |
| 7,602,374 B2 | 10/2009 | Zehner |
| 7,612,760 B2 | 11/2009 | Kawai |
| 7,679,599 B2 | 3/2010 | Kawai |
| 7,679,814 B2 | 3/2010 | Paolini, Jr. |
| 7,688,297 B2 | 3/2010 | Zehner |
| 7,729,039 B2 | 6/2010 | LeCain et al. |
| 7,733,311 B2 | 6/2010 | Amundson |
| 7,733,335 B2 | 6/2010 | Zehner |
| 7,787,169 B2 | 8/2010 | Abramson et al. |
| 7,839,564 B2 | 11/2010 | Whitesides et al. |
| 7,952,557 B2 | 5/2011 | Amundson |
| 7,956,841 B2 | 6/2011 | Albert |
| 7,999,787 B2 | 8/2011 | Amundson |
| 8,009,348 B2 | 8/2011 | Zehner |
| 8,034,209 B2 | 10/2011 | Danner |
| 8,077,141 B2 | 12/2011 | Duthaler |
| 8,094,364 B2 | 1/2012 | Park |
| 8,120,838 B2 | 2/2012 | Lin |
| 8,125,501 B2 | 2/2012 | Amundson |
| 8,139,050 B2 | 3/2012 | Jacobson |
| 8,174,490 B2 | 5/2012 | Whitesides |
| 8,207,541 B2 | 6/2012 | Van Herpen et al. |
| 8,270,064 B2 | 9/2012 | Feick |
| 8,283,750 B2 | 10/2012 | Guiraud et al. |
| 8,289,250 B2 | 10/2012 | Zehner |
| 8,300,006 B2 | 10/2012 | Zhou |
| 8,305,341 B2 | 11/2012 | Arango |
| 8,314,784 B2 | 11/2012 | Ohkami |
| 8,319,759 B2 | 11/2012 | Jacobson |
| 8,339,556 B2 | 12/2012 | Kagawa et al. |
| 8,373,649 B2 | 2/2013 | Low |
| 8,384,658 B2 | 2/2013 | Albert |
| 8,482,840 B2 | 7/2013 | Suzuki |
| 8,498,038 B2 | 7/2013 | Noh et al. |
| 8,558,783 B2 | 10/2013 | Wilcox |
| 8,558,785 B2 | 10/2013 | Zehner |
| 8,576,164 B2 | 11/2013 | Sprague |
| 8,593,396 B2 | 11/2013 | Amundson |
| 8,610,988 B2 | 12/2013 | Zehner |
| 8,728,266 B2 | 5/2014 | Danner |
| 8,928,562 B2 | 1/2015 | Gates |
| 9,230,492 B2 | 1/2016 | Harrington |
| 9,269,311 B2 | 2/2016 | Amundson |
| 9,412,314 B2 | 8/2016 | Amundson |
| 9,465,261 B2 | 10/2016 | Stahl et al. |
| 9,495,918 B2 | 11/2016 | Harrington |
| 9,513,743 B2 | 12/2016 | Sjodin et al. |
| 9,542,895 B2 | 1/2017 | Gates |
| 9,564,088 B2 | 2/2017 | Wilcox et al. |
| 9,612,502 B2 | 4/2017 | Danner |
| 9,620,048 B2 | 4/2017 | Sim |
| 9,620,067 B2 | 4/2017 | Harrington |

(56) References Cited

U.S. PATENT DOCUMENTS

| | | |
|---|---|---|
| 9,672,766 B2 | 6/2017 | Sjodin |
| 9,721,495 B2 | 8/2017 | Harrington |
| 9,740,075 B2 | 8/2017 | Sadlik et al. |
| 9,966,018 B2 | 5/2018 | Gates |
| 2003/0102858 A1 | 6/2003 | Jacobson |
| 2005/0104844 A1 | 5/2005 | Nakai |
| 2005/0253777 A1 | 11/2005 | Zehner |
| 2007/0091418 A1 | 4/2007 | Danner |
| 2007/0103427 A1 | 5/2007 | Zhou et al. |
| 2008/0024429 A1 | 1/2008 | Zehner |
| 2008/0024482 A1 | 1/2008 | Gates |
| 2008/0136774 A1 | 6/2008 | Harris |
| 2008/0291129 A1 | 11/2008 | Harris |
| 2009/0174651 A1 | 7/2009 | Jacobson |
| 2009/0322721 A1 | 12/2009 | Zehner |
| 2010/0220121 A1 | 9/2010 | Zehner |
| 2010/0265561 A1 | 10/2010 | Gates et al. |
| 2011/0193840 A1 | 8/2011 | Amundson |
| 2011/0193841 A1 | 8/2011 | Amundson |
| 2011/0199671 A1 | 8/2011 | Amundson |
| 2011/0286076 A1* | 11/2011 | Lin .................... G02F 1/167 359/296 |
| 2012/0293858 A1 | 11/2012 | Telfer |
| 2013/0063333 A1 | 3/2013 | Arango |
| 2013/0194250 A1 | 8/2013 | Amundson |
| 2014/0009817 A1 | 1/2014 | Wilcox et al. |
| 2014/0225815 A1* | 8/2014 | Jung .................... G09G 5/02 345/83 |
| 2014/0253425 A1 | 9/2014 | Zalesky |
| 2015/0262551 A1 | 9/2015 | Zehner |
| 2017/0371223 A1 | 12/2017 | Pradhan |
| 2018/0067372 A1 | 3/2018 | Jack et al. |

FOREIGN PATENT DOCUMENTS

| | | |
|---|---|---|
| JP | 2012042814 A | 3/2012 |
| KR | 20140086327 A | 7/2014 |
| WO | 2010126121 A1 | 11/2010 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, U. et al., "Nanomaterials-Based Electrochromics for Paper-Quality Displays", Adv. Mater, vol. 14, No. 11, pp. 845-848 (Jun. 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office; PCT/US2016/012157; International Search Report and Written Opinion; dated May 6, 2016.

European Patent Office, EP Appl. No. 16735290.5, Extended European Search Report, dated Jul. 9, 2018.

Korean Intellectual Property Office, PCT/US2018/067052, International Search Report and Written Opinion, dated Apr. 25, 2019.

\* cited by examiner

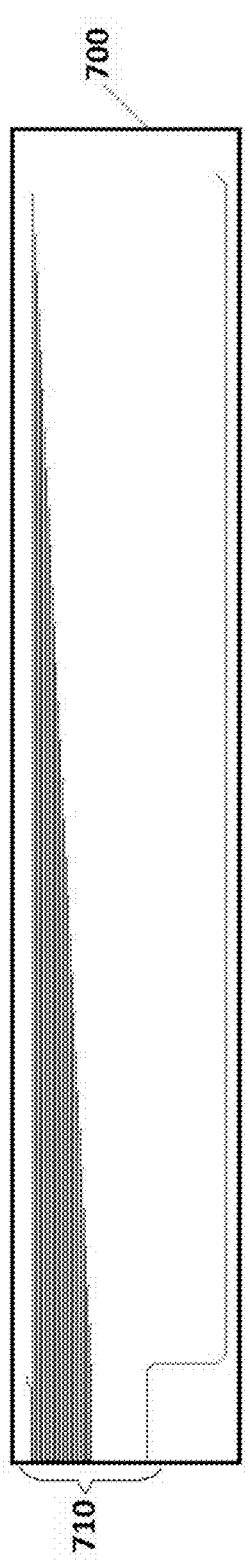
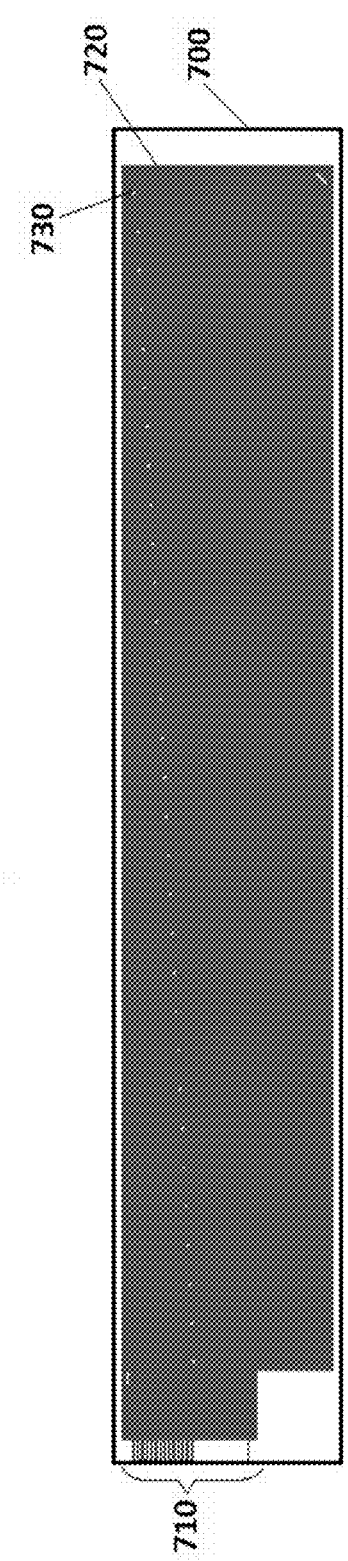

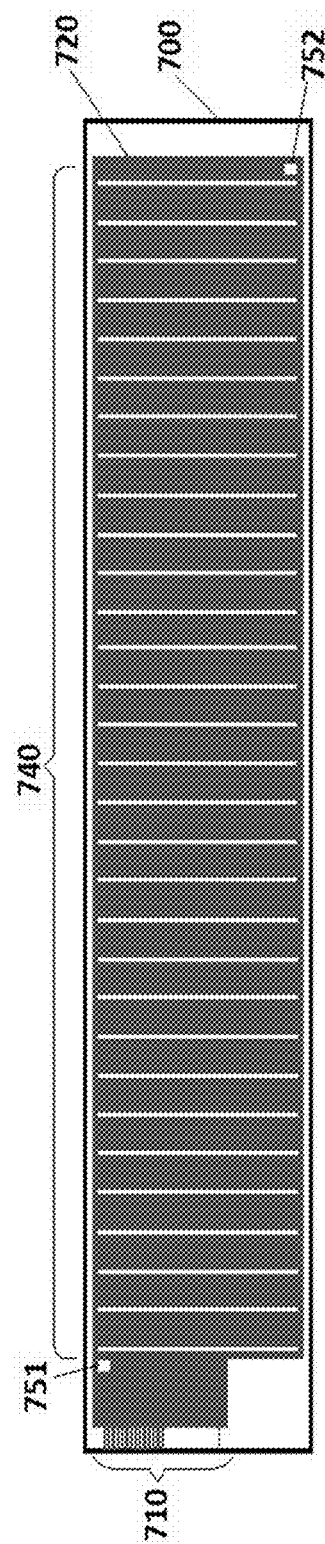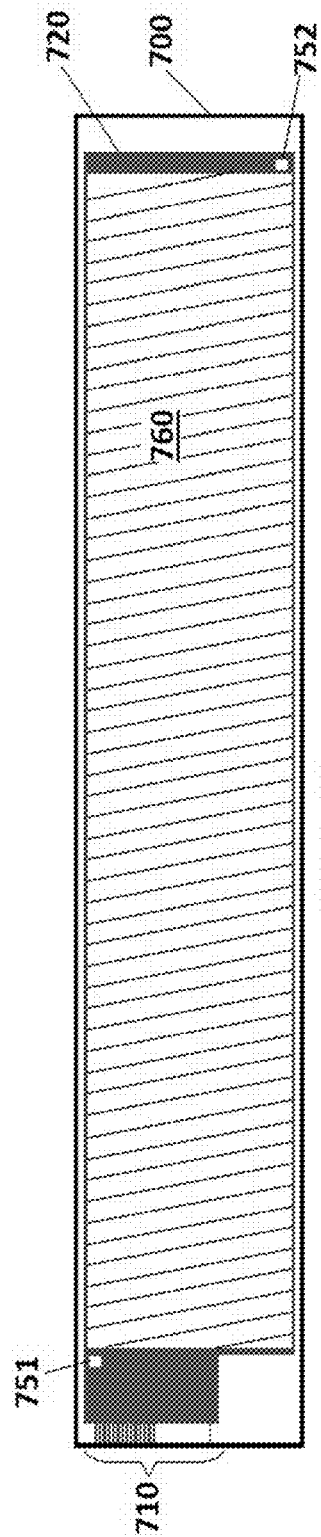

ELECTRO-OPTIC DISPLAYS, AND METHODS FOR DRIVING SAME

REFERENCE TO RELATED APPLICATIONS

This application is a continuation of application Ser. No. 15/852,807, filed on Dec. 22, 2017, which is a Continuation-In-Part of application Ser. No. 14/987,850, filed Jan. 5, 2016, which claims benefit of provisional application Ser. No. 62/100,031, filed Jan. 5, 2015, all of the contents of which are incorporated herein by reference in their entireties.

This application is also related to application Ser. No. 14/934,662, filed Nov. 6, 2015, which claims benefit of 62/077,154, filed Nov. 7, 2014, and of provisional Application Ser. No. 62/099,732, filed Jan. 5, 2015.

This application is related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; 8,305,341; 8,314,784; 8,373,649; 8,384,658; 8,558,783; 8,558,785; 8,593,396; and 8,928,562; and U.S. Patent Applications Publication Nos. 2003/0102858; 2005/0253777; 2007/0091418; 2007/0103427; 2008/0024429; 2008/0024482; 2008/0136774; 2008/0291129; 2009/0174651; 2009/0179923; 2009/0195568; 2009/0322721; 2010/0220121; 2010/0265561; 2011/0193840; 2011/0193841; 2011/0199671; 2011/0285754; 2013/0063333; 2013/0194250; 2013/0321278; 2014/0009817; 2014/0085350; 2014/0240373; 2014/0253425; 2014/0292830; 2014/0333685; 2015/0070744; 2015/0109283; 2015/0213765; 2015/0221257; and 2015/0262255.

The patents and applications mentioned in the preceding paragraph may hereinafter for convenience collectively be referred to as the "MEDEOD" (MEthods for Driving Electro-Optic Displays) applications. The entire contents of all the aforementioned patents and copending applications, and of all other U.S. patents and published and copending applications mentioned below, are herein incorporated by reference.

BACKGROUND OF INVENTION

The present invention relates to methods for driving electro-optic displays, especially bistable electro-optic displays, and to apparatus for use in such methods. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, and luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving an electro-optic display through a transition from an initial gray level to a final gray level (which may or may not be different from the initial gray level). The term "waveform" will be used to denote the entire voltage against time curve used to effect the transition from one specific initial gray level to a specific final gray level. Such a waveform may comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles moves through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. Nos. 7,075,502; and 7,839,564;

(f) Methods for driving displays; see the aforementioned MEDEOD applications;

(g) Applications of displays; see for example U.S. Pat. Nos. 7,312,784; and 7,312,784; and (h) Non-electrophoretic displays, as described in U.S. Pat. Nos. 6,241,921; 6,950,220; 7,420,549 8,319,759; and 8,994,705 and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

Alternatively, with an electro-optic medium which has a substantial threshold voltage (which most electrophoretic media do not) passive matrix driving may be used. In this type of driving, two sets of parallel elongate electrodes are provided on opposed sides of the electro-optic layer, with the two sets of electrodes being arranged perpendicular to each other, so that each pixel is defined by the intersection of one electrode in each of the two sets. Finally, electro-optic displays can make use of so-called "direct driving", in which a plurality of pixels are each provided with a separate conductor linking a pixel electrode to a display controller, which can thus directly control the potential of each pixel electrode.

Active and passive matrix displays are complicated and costly, especially in the case of large area displays, since the cost of the necessary electrodes tends to be a function of display area rather than number of pixels. However, active and passive matrix displays do have the flexibility to display any image, and can thus represent both pictures and text of varying point sizes. Direct drive displays tend to be less expensive, but lack flexibility, and if capable of displaying text typically are limited to a single point size and require a very large number of connections between the pixel electrodes and the controller; see, for example, U.S. Design Pat. No. D485,294, which requires 63 pixels to represent one character of various versions of the Latin alphabet in a single point size.

Hitherto, most commercial applications of electrophoretic and similar bistable electro-optic displays have been in small, relatively expensive products (such as electronic document readers, watches and solid state memory devices)

where the expense of an active matrix display can be tolerated, or a simple direct drive display suffices. However, there is increasing interest in applying such displays to furniture and architectural applications (see the aforementioned application Ser. No. 14/934,662), and in such applications the expense of either active matrix or direct drive is difficult to tolerate. Furthermore, in many furniture and architectural applications, the electro-optic display is intended to provide simple, typically moving, geometric patterns, so that the complex text and graphics capabilities of active matrix and direct drive displays are unnecessary. The present invention seeks to provide displays and driving methods useful in such furniture and architectural applications.

Previous proposals have been made to use resistor networks to control imaging; see for example U.S. Pat. Nos. 3,679,967 and 5,400,122. The displays and driving methods of the present invention do not make use of such resistor networks.

SUMMARY OF INVENTION

The present invention provides a (first or "spaced contact") display comprising a layer of electro-optic material, and first and second electrodes on opposed sides of the layer of electro-optic material, at least one of the first and second electrodes being light-transmissive, and at least one of the first and second electrodes having at least two spaced contacts, and voltage control means arranged to vary the potential difference between the two spaced contacts attached to the same electrode.

The term "light-transmissive" is used herein in its conventional meaning in the display art, as described for example in the aforementioned U.S. Pat. No. 6,982,178, to mean transmitting sufficient visible light to enable an observer viewing the electro-optic material through the light-transmissive electrode to observe changes in the optical state of the electro-optic material.

In a preferred form of the spaced contact display of the present invention, both the first and second electrodes have at least two spaced contacts and the voltage control means is arranged to vary the potential differences between of the two spaced contacts attached to each electrode. The or each electrode may of course have more than two spaced contacts; if this is the case, it is not absolutely essential that the voltage control means be arranged to vary the potentials of all but one of these contacts independently of each other; for example, the contacts may be divided into two or more groups, with the contacts in each group being maintained at the same potential but with a potential difference being applied between the different groups.

The spaced contact display of the present invention may have more than one electrode on each side of the layer of electro-optic medium. Indeed, in the case of very large displays (perhaps covering very large walls), it may be necessary or desirable for the display to be divided into a series of separate modules, each of which has an electro-optic layer sandwiched between first and second electrodes. Also, a spaced display of the present invention may have differing numbers of electrodes on each side of the layer of electro-optic medium.

In the spaced contact display of the present invention, the or each electrode having two contacts may simply have the form of a uniform strip extending between the two contacts. However, more interesting visual effects may be produced by using non-uniform electrodes. For example, at least one of the first and second electrodes may be interrupted by at least one non-conductive area such that electrical current must follow a non-linear path between the two contacts on that electrode. Examples of possible geometric arrangements of such non-linear paths are discussed below with reference to the drawings. Alternatively, at least one of the first and second electrodes may be divided into a plurality of sections having differing electrical resistance per unit length, and/or into a plurality of sections having differing electrical capacitance per unit area. The electrode having two contacts may also be provided in the form of a plurality of conductive traces or areas on a backplane and configured to operate as a bus bar. In one embodiment the electrode may comprise a first plurality of conductive lines, a layer of insulating material applied over the first plurality of conductive lines, a second plurality of conductive lines applied to the layer of insulating material, and a layer of resistive material in electrical contact with the second plurality of conductive lines. The layer of insulating material may be configured to electrically connect each conductive trace in the first plurality of conductive lines to a single conductive line in the second plurality of conductive lines and each conductive line in the second plurality of conductive lines to a single conductive line in the first plurality of conductive lines. In yet another embodiment, the electrode may comprise a plurality of conductive lines, a layer of insulating material applied over the first plurality of conductive traces lines, a plurality of conductive areas applied over the layer of insulating material, and a layer of resistive material in electrical contact with the plurality of conductive areas. The layer of insulating material may be configured to electrically connect each conductive line in the plurality of conductive lines to a single conductive area and each conductive area to a single conductive line.

As discussed in several of the MEDEOD applications mentioned above, if the waveform applied to an electro-optic display is not DC balanced, damage to the electrodes may result, especially in the case of light-transmissive electrodes, which are typically very thin, less than 1 µm. To reduce or eliminate such damage to electrodes, at least part of one of the first and second electrodes may be provided with a passivation layer disposed between the electrode and the layer of electro-optic material. Appropriate passivation layers are described in, for example, U.S. Pat. No. 6,724,519.

The present invention also provides a method of driving a spaced contact electro-optic display, the method comprising: providing a display comprising a layer of electro-optic material, first and second electrodes on opposed sides of the layer of electro-optic material, at least one of the first and second electrodes having at least two spaced contacts; and applying between the two contacts on the same electrode a potential difference which varies with time.

In such a "spaced contact" method, both the first and second electrodes may have at least two spaced contacts and the voltage control means may be arranged to apply a potential difference which varies with time between the pairs of contacts attached to both the first and second electrodes; the voltage control means may vary the potential differences applied to the first and second electrodes at differing frequencies. The voltage control means may vary the potential differences applied to at least one of the first and second electrodes as, for example, a sine wave, a triangular wave, a saw tooth wave or a square wave of fixed or varying frequency.

This invention also provides a (second or "isolated electrode") display comprising a layer of electro-optic material, and a sequence of at least three electrodes disposed adjacent the layer of electro-optic material so as to apply an electric field thereto, the electrodes on at least one surface of the layer of electro-optic material being light-transmissive, and voltage control means arranged to vary the potential difference between the first and last electrodes of the sequence, and wherein:

(a) each electrode of the sequence lies on the opposed side of the layer of electro-optic material from both the electrode which precedes it in the sequence and the electrode which follows it in the sequence;

(b) each electrode of the sequence has a first edge which overlaps with or lies adjacent the electrode which precedes it in the sequence and a second edge which overlaps with or lies adjacent the electrode which follows it in the sequence; and (c) each electrode of the sequence, other than the first and last thereof, is electrically isolated such that the potential thereof is controlled by passage of current through the layer of electro-optic material.

This invention also provides a method of driving an isolated electrode display of the present invention, which method comprises providing an isolated contact display (as defined above) and causing the voltage control means to apply a potential difference between the first and last electrodes of the sequence. The voltage control means may be arranged to apply a potential difference which varies with time between the first and last electrodes.

The displays and driving methods of the present invention may make use of any of the type of electro-optic media discussed above. Thus, for example, the electro-optic display may comprise a rotating bichromal member, electrochromic or electro-wetting material. Alternatively, the electro-optic display may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

BRIEF DESCRIPTION OF THE DRAWINGS

FIGS. 7A to 7D is a schematic top plan view of the various layers of a backplane according to a sixth embodiment of the present invention.

DETAILED DESCRIPTION

Figure 1:
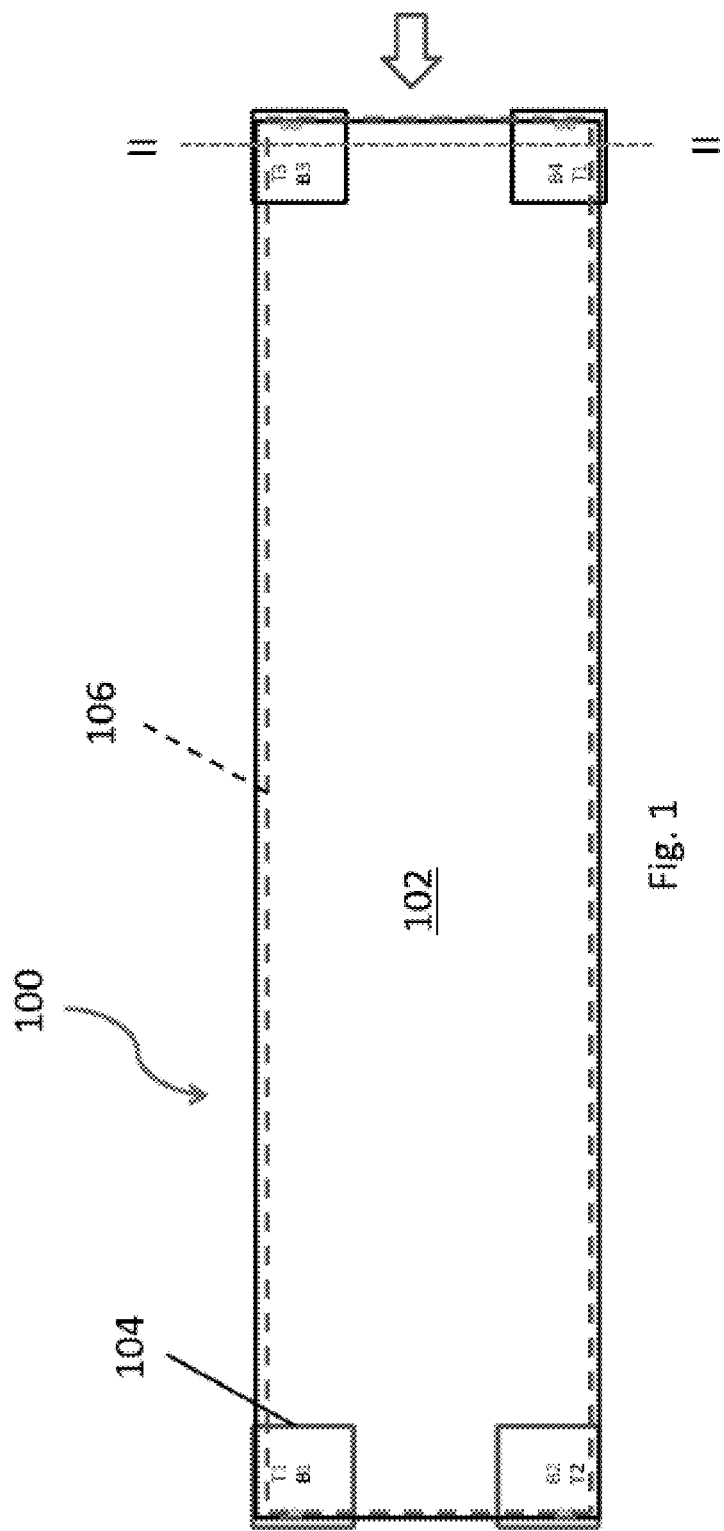
FIG. 1 of the accompanying drawings is a highly schematic top plan view of a display of the present invention illustrating the positions of the contacts on the first and second electrodes, this display being intended for use as a coffee table.

As already mentioned, the present invention provides a spaced contact display comprising a layer of electro-optic material, first and second electrodes on opposed sides of the layer of electro-optic material, at least one of the first and second electrodes having at least two spaced contacts, and voltage control means arranged to vary the potential difference between the two spaced contacts attached to the same electrode.

As described above, most conventional electro-optic displays, whether of the active matrix or direct drive types, use a single light-transmissive "common" electrode on one side of the electro-optic layer and an array of electrodes (either pixel electrodes or direct drive electrodes) on the opposed side of the electro-optic layer. The potential difference between each of the array of electrodes and the common electrode is controlled by the display driver, so that each array electrode controls (in principle) the changes in optical state of the area of electro-optic medium lying between that array electrode and the common electrode, these changes depending on the polarity and magnitude of the potential difference and the time for which it is applied. (It is common practice to provide multiple connections to the front electrode to reduce the risk of bad contacts, but such multiple connections are not independently controllable.) In contrast, the display of the present invention relies upon potential differences between two or more spaced contacts on a single electrode to generate potential gradients within that electrode, and hence varying potential differences between difference areas of that single electrode and the electrode on the opposed side of the electro-optic layer. (If, as is typically the case, both electrodes of the display are provided with multiple contacts, potential gradients will exist within both electrodes, and the potential difference applied to any point in the electro-optic layer will be the difference between the potentials at the points on the two electrodes lying on either side of the selected point in the electro-optic layer.) Thus, the potential difference applied to the electro-optic layer will vary continuously across the electro-optic layer, and will result in a corresponding continuous variation in the optical state of the electro-optic medium. These potential difference allow the generation of simple patterns and switching effects.

Since the display of the present invention is intended to operate by developing potential gradients within the electrodes (by providing, within one electrode, a potential gradient between the two or more contacts attached to the electrode), the resistance provided by the electrodes is of major importance. Too low an electrode resistance would produce excessive currents within the electrode, which may short out electronics in the voltage control means, and may cause other problems, for example excessive local heating which might damage the electro-optic layer. On the other hand, excessive electrode resistance may result in very short range propagation of voltages from the spaced contacts, resulting in switching of only very small areas adjacent the contacts and the need for numerous contacts if the entire area of the display is to be switched.

Furthermore, because various embodiments of the displays made according to the present invention may rely on reflected ambient light to view the images produced by the electro-optic material, light losses from the light-transmissive electrode should be minimized. For example, ambient light will travel through the light-transmissive electrode twice in the displays according to the various embodiments of the present invention, first as the ambient light travels from its source to the surface of the electro-optic material and a second when the light is reflected from the electro-optic material to the viewer. As noted above, the electrode material should form a sufficiently high conductive front electrode to ensure enough current for the uniform driving of the display. Thicker layers of electrode material will have greater conductivity; however, thicker layers will also cause increased light loss because the materials are not colorless. Indium tin oxide (ITO) is highly colored, but the effect of this color may be minimized by applying an extremely thin layer on the order of 2000 Å, for example.

Although of course optimum electrode resistance will vary with the size of the display, the number of contacts, and the properties of the specific electro-optic medium used, in general the sheet resistance of the light-transmissive electrode material is preferably about 500 to about 50,000 Ohm/sq, more preferably about 1,000 to about 15,000 Ohm/sq, and most preferably about 300 to about 5000 ohms/square. Light-transmissive conductors such as PEDOT, carbon nanotubes, graphene and nanowires can of course be used if desired.

The electro-optic materials used in the displays of the present invention will normally be bistable display materials such as electrochromic, rotating bichromal member or electrophoretic materials. Such bistable materials change their electro-optic states only after exposure to electric field for significant periods, typically of the order of 0.1 to 1 second. Accordingly, the appearance of the display of the present invention is controlled not only by the potentials present on the various areas of each electrode as the potentials at the spaced contacts vary, but also by the speed at which the electro-optic material used reacts to the electric fields to which it is exposed. Also, as discussed in some of the aforementioned MEDEOD applications, some electro-optic materials are subject to a phenomenon known as "blooming" by which changes in potential at an electrode affect the electro-optic state of the material over an area larger than that of the electrode itself. Although blooming is often treated as a problem in electro-optic displays, since it tends to distort the image displayed, in at least some displays of the present invention blooming may actually be advantageous in hiding otherwise inactive areas of the display. For example, as already mentioned in some displays of the present invention, the first and/or second electrode may be interrupted by at least one non-conductive area such that electrical current must follow a non-linear path between the two contacts on that electrode. Blooming may be used to conceal the optical effects of such non-conductive areas. Indeed, in some cases it may be desirable to engineer the electro-optic material with increased blooming to assist in such concealment.

A typical display of the present invention may comprise the following layers in order:

(a) a transparent conductive layer (the "front electrode") forming the viewing surface of the display;
(b) a layer of an encapsulated electrophoretic medium;
(c) a layer of lamination adhesive; and
(d) a "backplane" comprising of a substrate (typically a polymeric film) and a conductor which need not be transparent A least two areas of each electrode in layers (a) and (d) are cleaned to expose the conductor for electrical contacts, which can be independently addressed. Finally, the display comprises a voltage control means to drive the front electrode and the backplane to positive and negative potentials relative to each other, and to produce a potential gradient within each electrode.

Such a display has been produced using the following materials. The front electrode was formed of 5 mil (127 µm) polyethylene terephthalate coated on one surface with ITO, grade OC300 or 450. Alternatively, the front electrode can be coated on to the remaining layer of the display without any supporting substrate. The encapsulated electrophoretic medium was substantially as described in U.S. Pat. No. 8,270,064, and the lamination adhesive was a 25 µm layer substantially as described in U.S. Pat. No. 7,012,735 containing 5000 ppm of tetrabutylammonium hexafluorophosphate dopant to control electrical properties. The backplane was a PET/ITO film similar to that used for the front electrode, but a printed carbon conductor or other low cost transparent or non-transparent conductor could be substituted.

Figure 2:
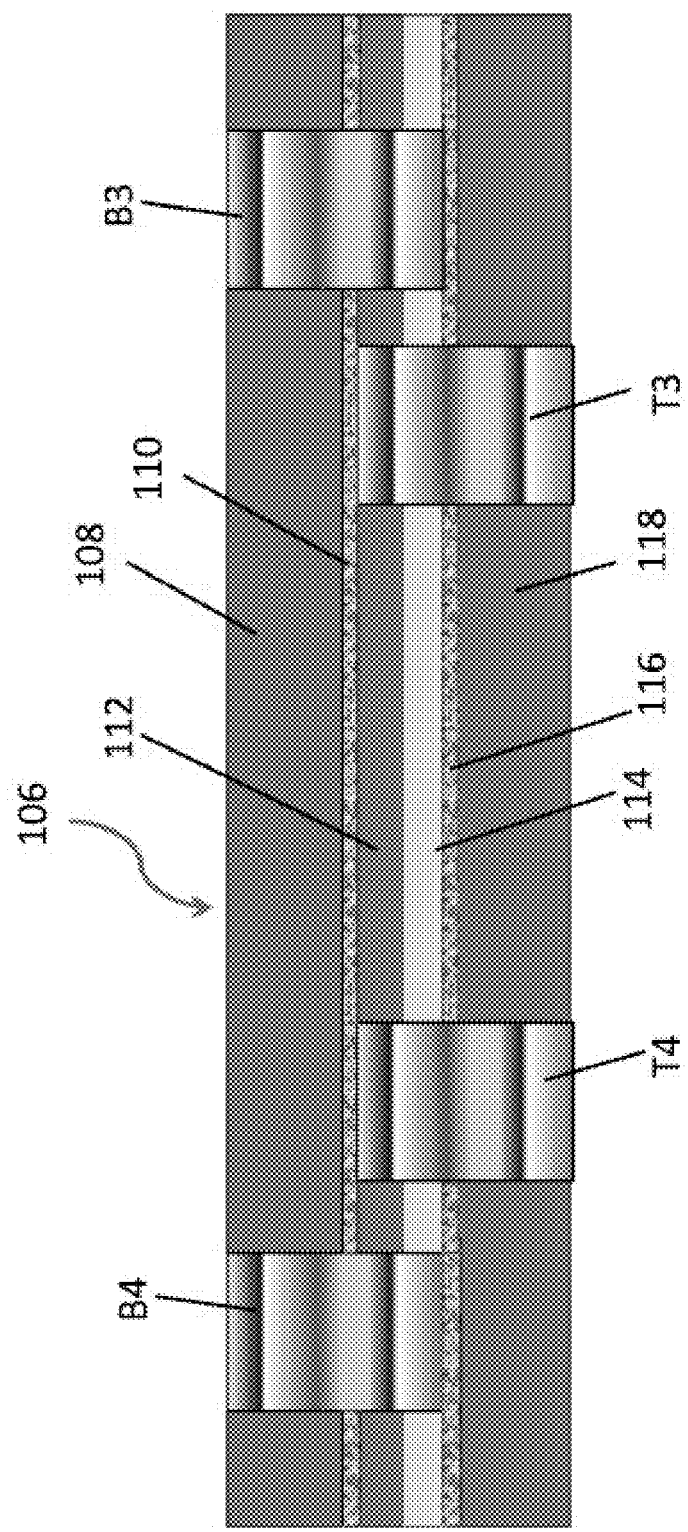
FIG. 2 is a highly schematic section along the line II-II in FIG. 1 looking in the direction of the arrow.

A display of this type in use as a coffee table is illustrated schematically in FIGS. 1 and 2 of the accompanying drawings. As shown in FIG. 1, the coffee table (generally designated 100) comprises an elongate rectangular glass top 102 supported at its four corners on legs 104. The display itself, generally designated 106, is supported beneath the glass top 102 of the table so that the glass top can protect the display 106 from mechanical damage.

As shown in FIG. 2, the display 106 comprises a PET film 108 bearing an ITO front electrode 110 which extends across the entire area of the display 106. In contact with the front electrode 110 is an encapsulated electrophoretic medium 112, the lower surface of which carries a layer of lamination adhesive 114, which secures the encapsulated electrophoretic medium 112 to a backplane comprising a layer of ITO electrode 116 on a PET film 118. As shown in FIG. 1, the front electrode 110 is provided with four contacts T1-T4 arranged close to the corners of the rectangular table, while the backplane electrode 116 is similarly provided with four contacts B1-B4 arranged in a similar manner.

FIG. 2 illustrates the manner in which the contacts T1-T4 and B1-B4 are formed. The contacts B1-B4 are produced by kiss cutting apertures through the upper film 108, typically with a laser cutter, and cleaning the underlying portions of the electrophoretic medium 112 and the lamination adhesive 114. Similarly, the contacts T1-T4 are produced by kiss cutting apertures through the lower film 118 and cleaning the overlying portions of the electrophoretic medium 112 and the lamination adhesive 114 using solvent and rubbing either by hand or with mechanical means like an electric toothbrush. The resultant apertures are filled with a conductive material, for example a carbon-filled adhesive or a conductive ink, to produce contacts which can be addressed individually. A voltage control means capable of driving contacts T1-T4 and B1-B4 independently to positive and negative potentials is provided by a display controller (not shown) having 12 outputs each capable of supplying any voltage and waveform between ±30 V programmable on each channel independently, 30V and also having a high impedance or float state. The controller has one drive line for each output, direct drive.

The display shown in FIGS. 1 and 2 may be constructed substantially as described in the aforementioned U.S. Pat. No. 6,982,178. A PET/ITO film (which will eventually form the lower film 108 and the electrode 110) is coated with, or laminated to, the electrophoretic medium 112 to form a PET/ITO/electro-optic subassembly. A second PET/ITO film (which will eventually form the lower film 118 and the electrode 116) is laminated to the subassembly with lamination adhesive. As previously noted, the lower electrode 116 may or may not be transparent since the electrophoretic medium 112 does not transmit light. The resultant structure is a full electro-optic display capable of switching given correct electrical connections. This medium can be created on a large roll-to-roll basis and can be cut (typically laser cut) to the size required for individual displays, say 16×60 inches (406×1523 mm) for the illustrated coffee table. Other construction methods could also be used, for example formation of a front plane laminate (FPL) as described in the aforementioned U.S. Pat. No. 6,982,178, followed by cutting of the FPL being cut to size before lamination to the backplane. The substrate in the kiss cut area is removed and then the electrophoretic media is cleaned. The greater the number of contacts and the spatial distribution of these contacts around the periphery of the display, the more complex the pattern of switching that can be effected.

The driving of the display shown in FIGS. 1 and 2 may for example be effected top contacts T2 and T3 set to −20V and +20V respectively, while backplane contacts B2 and B3 are set to ground, with all of the remaining contacts allowed to float. If this driving pattern is maintained for more than about 1 second, the optical state of the electrophoretic layer will be half dark and half white with a diffuse gradient area in the center. If the driven electrodes are instead fed variable voltage patterns instead of fixed voltages, moving patterns are produced in the electrophoretic layer. For example, if one contact receives a 20V amplitude sine wave at 0.1 Hz frequency and the other driven contact on the same electrode receives a 20V amplitude sine wave at 0.09 Hz frequency, a wave of black to white switching will move slowly across the display with different speeds and different directions, left to right or right to left, varying with time due to the differing frequency of the two sine waves supplied. The speed and direction of the moving wave of white to black or black to white can be made to be constant and repeating by making the frequency of the two sine waves the same and giving them a constant phase difference. More complex patterns can be formed by driving two contacts at opposite ends of a diagonal of the display, especially if the opposite diagonals are used in the top and bottom electrodes. Still more complex patterns can be produced by providing a larger number of contacts around the periphery of the display.

Although the display shown in FIGS. 1 and 2 has electrodes in the form of simple rectangles, so that each electrode is essentially uniform between the spaced contacts at its two ends, the present invention is not restricted to rectangular or any particular shape of displays, and interesting effects can be produced using polygonal (for example, hexagonal or octagonal) displays, or circular or elliptical displays. In such cases, one or more contacts may be provided around the periphery of the display and another contact in the center of the display so that changes in the electro-optic material propagate radially rather than linearly. Furthermore, the present invention is not confined to planar, two-dimensional displays, but may be applied to three-dimensional objects. Both electrodes and electro-optic media can be deposited on three-dimensional objects; for example, electrodes formed from organic conductors may be deposited from solution and electrophoretic media may be deposited by spray techniques.

Figure 3:
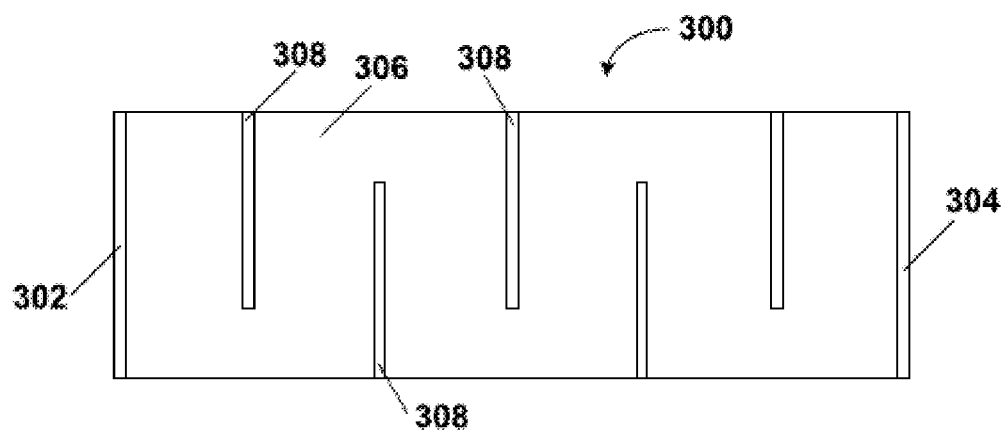
FIG. 3 is a schematic top plan view of a second display of the invention in which gaps are provided in one electrode so that electrical current must follow a non-linear path between the two contacts of the electrode.

Furthermore, interesting optical effects may be obtained by providing gaps in one or both electrodes, for example by removing or chemically altering the electrode material, so that electrical current must follow a non-linear path between the two contacts on that electrode. FIG. 3 is a schematic top plan view of a display (generally designated 300) of this type. As with the display 100 shown in FIGS. 1 and 2, the display 300 has the form of an elongate rectangle, with strip contacts 302 and 304 provided at it opposed ends. The electrode 306 extending between the contacts 302 and 304 is interrupted by a plurality of non-conductive areas 308 so that electrical current (and thus electro-optic effects) must follow a substantially sinusoidal course between the contacts 302 and 304, Non-conductive areas such as areas 308 in FIG. 3 can be used to "channel" electro-optic effects in a variety of interesting patterns. For example, a circular, elliptical or polygonal display may have a single contact on the periphery of the display, a second contact at the center of the display, and a spiral non-conductive areas to channel electro-optic effects along a spiral electrode extending between the two contacts. Even greater freedom of design is available in the case of three-dimensional displays; for example, a display formed on a cylindrical substrate could use a helical non-conductive area to channel electro-optic effects along a helical path between contacts provided at opposed ends of the cylindrical substrate.

Figure 4:
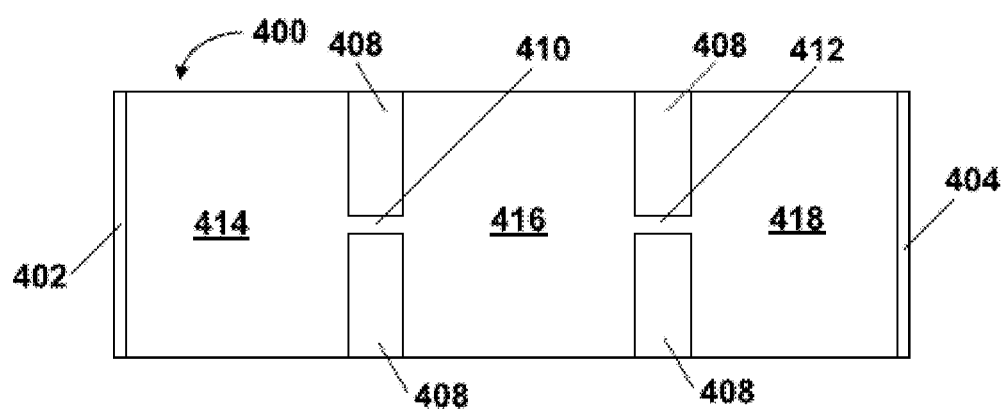
FIG. 4 is a schematic top plan view, generally similar to that of FIG. 3, of a third display of the invention in which one electrode is divided into of sections having differing electrical resistance per unit length.

As already mentioned, in a spaced contact display of the present invention, at least one of the first and second electrodes may be divided into a plurality of sections having differing electrical resistance per unit length, and a schematic top plan view of such a display (generally designated 400) is shown in FIG. 4. The display 400 is generally similar to the display 300 shown in FIG. 3 in that the display 400 has the form of an elongate rectangle provided at its opposed ends with contacts 402 and 404. Also, like the display 300, the display 400 is provided with non-conductive areas 408. However, the arrangement of the areas 408 differs from that of the areas 308 in FIG. 3; the areas 408 are in the form of two adjacent pairs of area extending from opposed long edges of the display 400 so as to leave between each adjacent pair a narrow "neck" or "isthmus" of conductive material 410 or 412. Thus, current passing between the contacts 402 and 404 passes successively through a low resistance region 414, the high resistance neck 410, a low resistance region 416, the high resistance neck 412 and a low resistance region 418.

FIG. 4 illustrates the formation of regions of varying resistance by varying the width of the electrode, but of course other techniques for varying resistance could be employed. For example, the display shown in FIG. 4 could be modified by replacing each neck region 410 and 412 with contacts provided on the adjacent regions and interconnected via an appropriate resistor. To avoid the unsightly presence of visible electrical components, resistors and associated conductors could be accommodated within the frame surrounding the display, such as is often present in, for example, conventional coffee tables. The ability to interconnect electrode regions "invisibly" by means of electrical components disposed within such a frame does provide an additional degree of design freedom, namely the ability to arrange electrode segments electrically in an order which differs from their physical location. For example, consider a modified version of the display 400 in which the electrode is divided into five segments (designated for convenience A, B, C, D and E reading left to right in FIG. 4) rather than the three segments 414, 416 and 418 shown in FIG. 4, with the segments A-E being interconnected via conductors and resistors hidden within a frame. The electrical interconnections could be arranged so that the electrodes segments are electrically interconnected in the order (say) A, D, B, C, E, which will produce electro-optic effects which appear to jump around the display rather than progressing linearly along it as in the display 100 shown in FIGS. 1 and 2.

Figure 5:
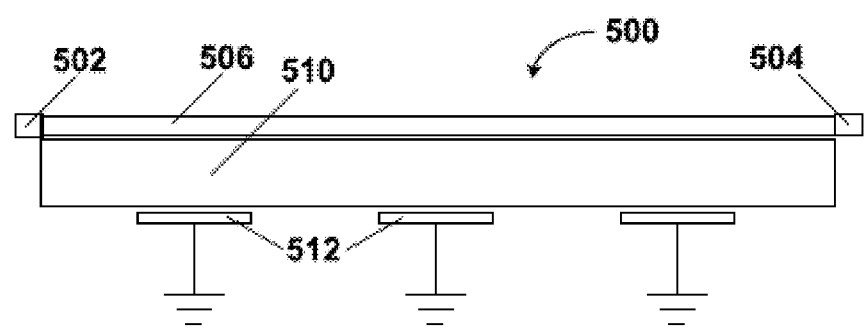
FIG. 5 display of the invention in which one electrode has regions of varying capacitance per unit area.

Instead of providing regions of various resistance within an electrode, regions of varying capacitance may be used, and a schematic cross-section through such a display (generally designated 500) is shown in FIG. 5. The display 500 is generally similar to the displays 300 and 400 shown in FIGS. 3 and 4 respectively inasmuch as it has the form of an elongate rectangle with an electrode 506 provided with contacts 502 and 504 at its opposed ends. However, unlike the illustrated electrodes of the displays 300 and 400, electrode 506 of display 500 is uninterrupted. However, electrode 506 is provided with regions of varying capacitance per unit area by providing, on the opposed side of electro-optic medium from electrode 506 a series of spaced electrodes 512, all of which are grounded. It will readily be apparent that regions of the electrode 506 lying opposite electrodes 512 will have a substantially greater capacitance per unit area than regions of the electrode 512 which do not lie opposite electrodes 512, thus providing variations in the electro-optical performance of the display 500 generally similar to those provided by the regions of varying resistance in display 400. (Typically, an adhesive layer similar to adhesive layer 114 shown in FIG. 2 will be present either between electro-optic layer 510 and electrode 506 or between electro-optic layer 510 and electrodes 512. The adhesive layer is omitted from FIG. 5 for ease of illustration but its presence or absence makes no difference to the fundamental manner of operation of display 500.)

One embodiment of an isolated electrode display of the present invention will now be described with reference to FIG. 6. Conceptually, an isolated electrode display might be regarded as a modification of the variable resistance electrode display of the type shown in FIG. 4, with the modification comprising using the electro-optic layer itself as the high resistance regions between the low resistance electrodes. This modification places successive high resistance regions (electrodes) on opposed sides of the electro-optic layer, so that only a single set of electrodes are required.

Figure 6:
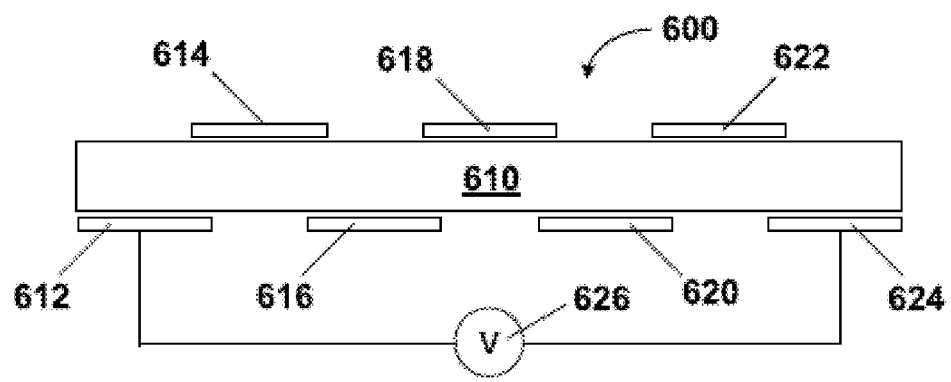
FIG. 6 is a schematic cross-section through a fifth, isolated electrode display of the invention.
Figure 8A:
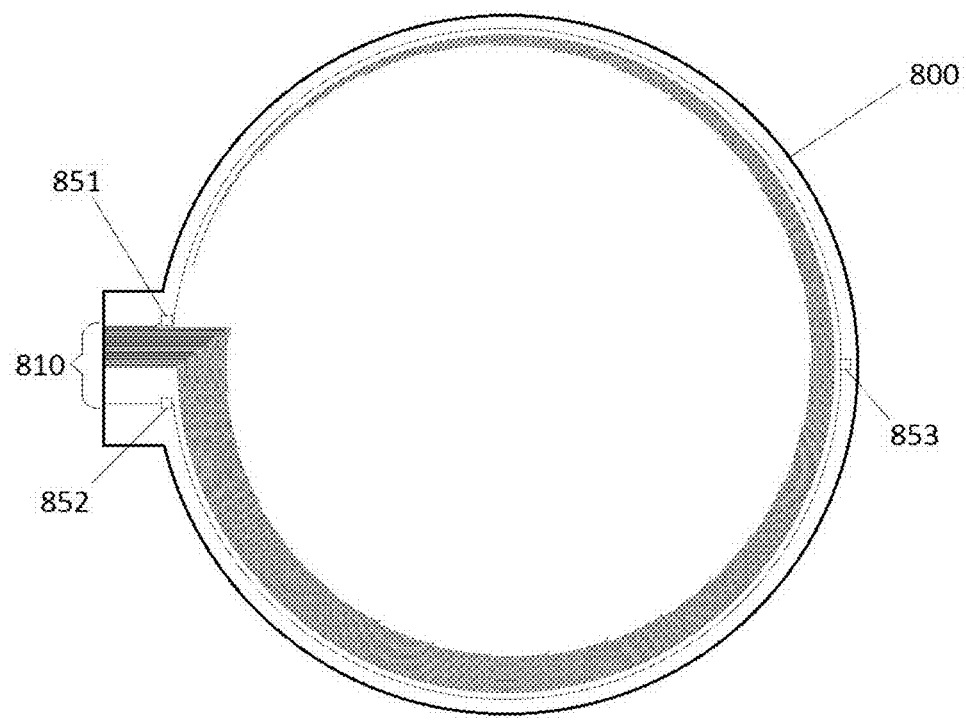
FIGS. 8A to 8D is a schematic top plan view of the various layers of a backplane according to a seventh embodiment of the present invention.
Figure 8B:
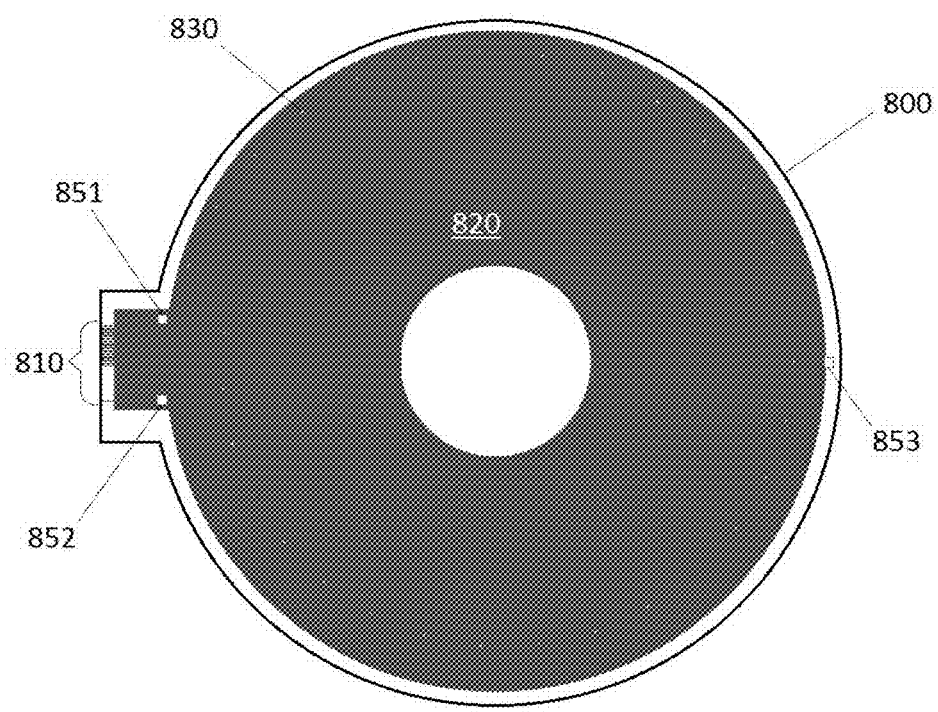
Figure 8C:
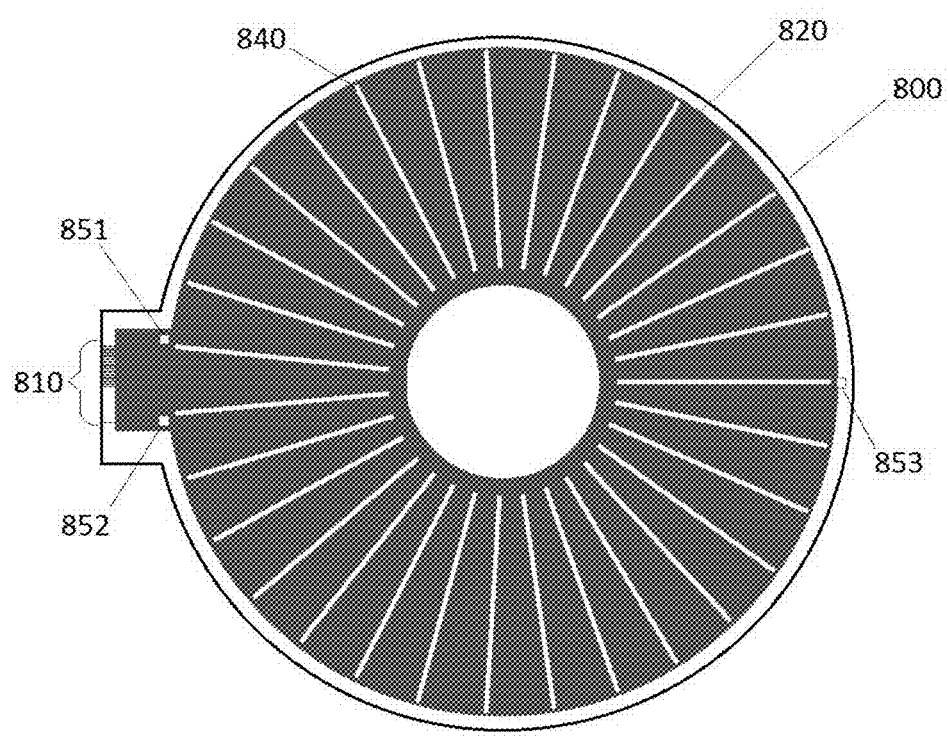
Figure 8D:
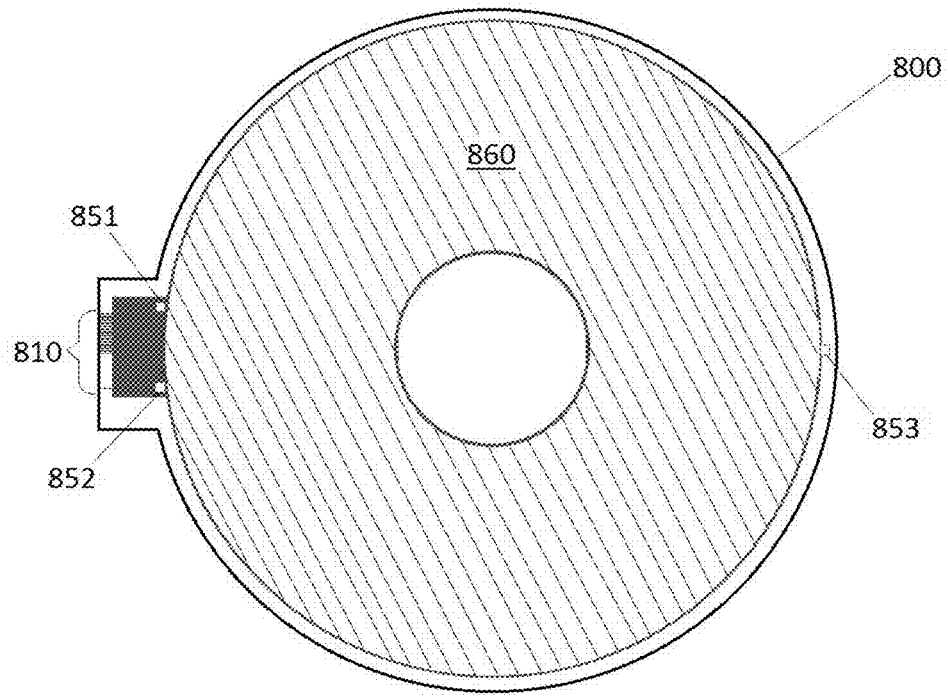
Figure 9A:
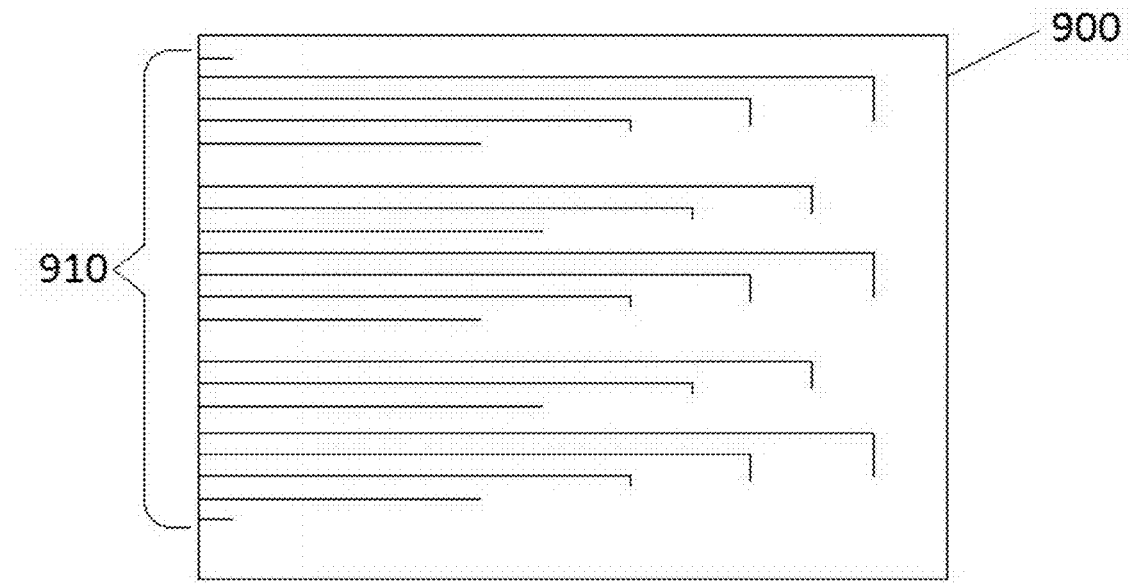
FIGS. 9A to 9D is a schematic top plan view of the various layers of a backplane according to a seventh embodiment of the present invention.
Figure 9B:
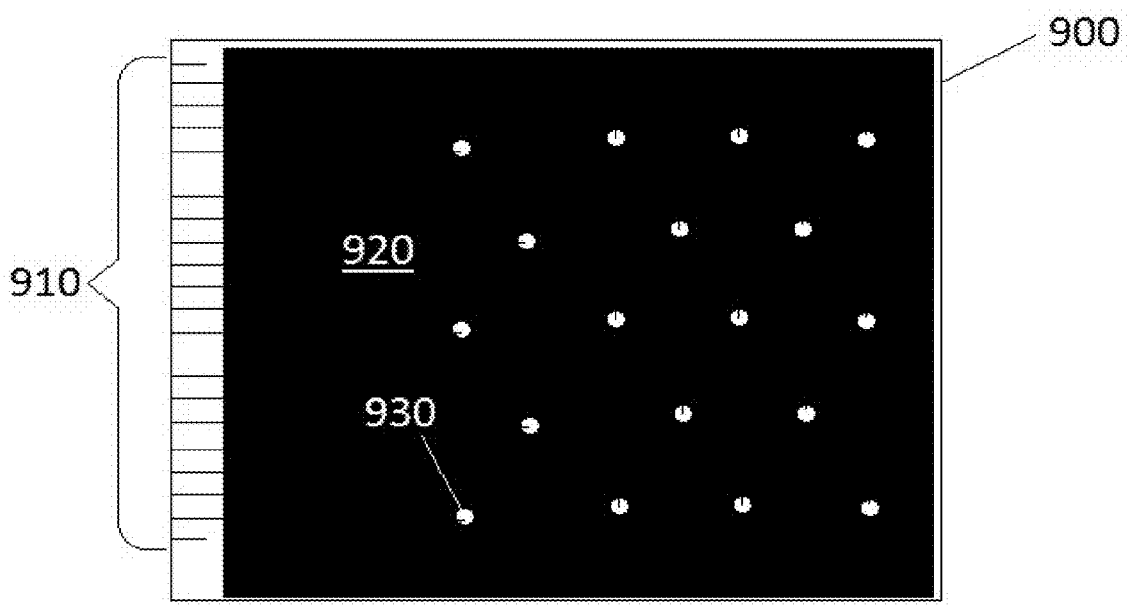
Figure 9C:
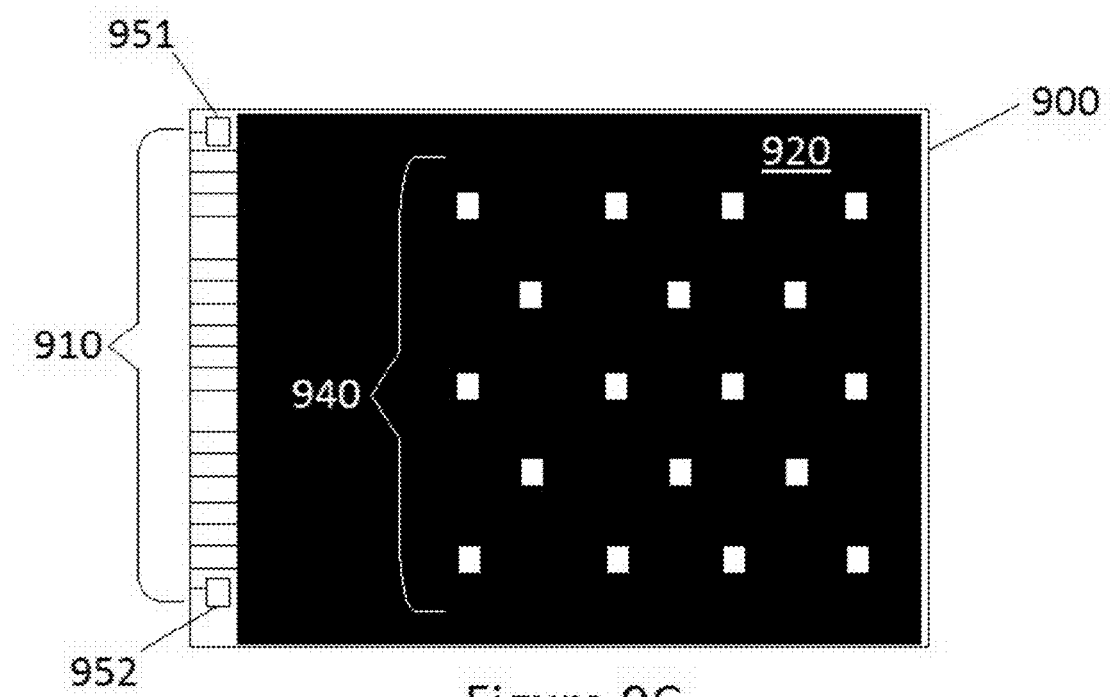
Figure 9D:
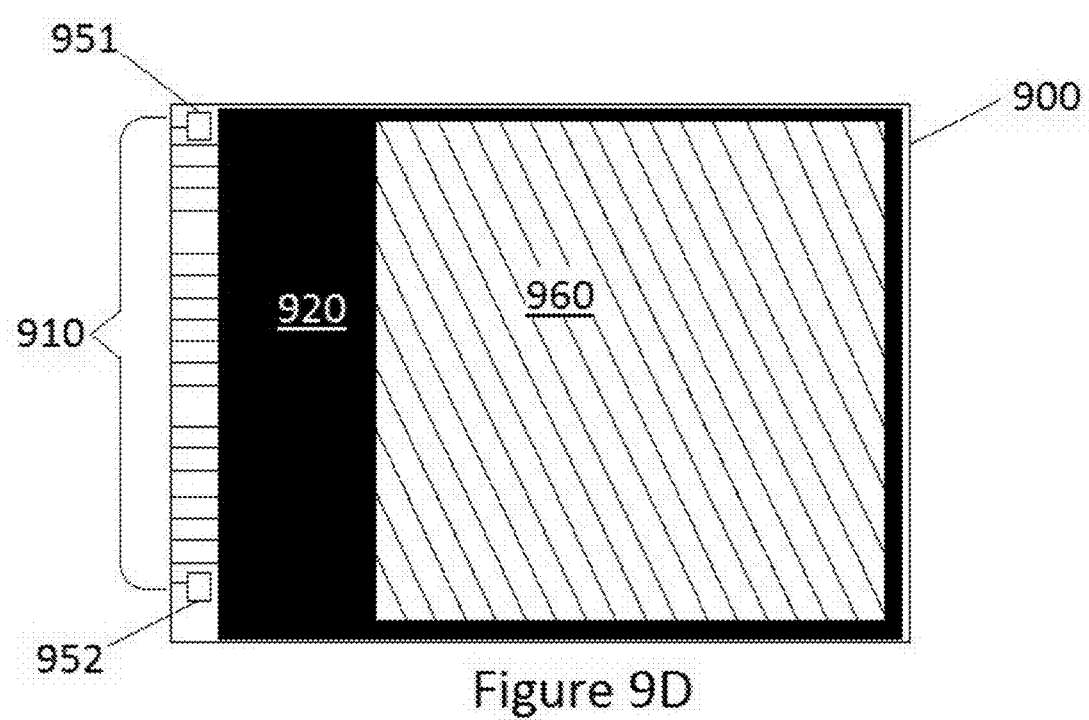

More specifically, as shown in FIG. 6, the isolated electrode display (generally designated 600) has the form of an elongate rectangle similar to that of the displays comprises a layer 610 of electro-optic material and a sequence of seven electrodes 612-624, each of which has the form of an elongate strip extending across the full width of the display. The first and last electrodes 612 and 624 respectively are connected to a voltage control unit (indicated schematically at 626) which enables a time varying potential difference to be applied between electrodes 612 and 624. The remaining electrodes 614-622 are electrically isolated so that their potentials are controlled by passage of current through the layer 610 of electro-optic material. The electrodes 612-624 alternate between the lower and upper surfaces (as illustrated) of the layer 610, and the electrodes 614, 618 and 622 on the upper surface (which is the viewing surface of the display) are light-transmissive; the electrodes 612, 616, 620 and 624 may or may not be light-transmissive. As may be seen from FIG. 6, each of the electrodes 614-622 has a first edge (its left-hand edge as illustrated in FIG. 6) which overlaps with the preceding electrode and a second edge (its right-hand edge as illustrated in FIG. 6) which overlaps with the following electrode. It is not absolutely necessary that the adjacent edges overlap provided that they lie adjacent each other so as to leave a conductive path of reasonable length through the layer 610. It will be appreciated that it is not necessary that the first and second edges of the electrodes be on opposed sides of the electrode. For example, the electrodes 612-624 could be in the form of isosceles triangles, so that the first and second edges would not be parallel, or the electrodes could be arranged in the form of a checkerboard, in which case some electrodes would have first and second edges at right angles to each other.

Application of a time-varying potential difference by voltage control means 626 between electrodes 612 and 624 will cause a complex variation in the potentials of the electrodes 614-622, depending upon factors such as resistivity of the layer 610, the capacitances between the electrodes, polarization within the layer 610, etc., and an even more complex variation in the optical state of the various parts of the layer 610. Most commonly, the various parts of the layer 610 will be perceived to "flicker" as the voltage applied by the voltage control means 626 is varied. In yet another embodiment, a display made according to the present invention may include a backplane that is configured to accomplish a low power wave switch. Referring to FIGS. 7A to 7D, the backplane may comprise a rectangular substrate 700 on which a first plurality of conductive lines or traces 710 of varying lengths may be printed. One end of each of the conductive lines 710 may be connected to a drive circuit (not shown). A layer of insulating material 720 may then be applied over the first plurality of conductive lines 710, except for a plurality of voids 730 leaving the unconnected ends of the first plurality of conductive lines 710 exposed. A second plurality of conductive lines or traces 740 may be applied over the layer of insulating material 720, such that each of the conductive lines 740 traverses and is in electrical contact with a respective first conductive line 710. This may be achieved by printing the second plurality of conductive lines 740 over the voids 730 in the insulating material 720. The location of the voids in the layer of insulating material and the second plurality of conductive lines are precisely located to prevent an electrical short between unassociated conductive lines. Therefore, each conductive line in the first plurality is in electrical with only one line within the second plurality and vice versa. One or more contact pads 751, 752 may also be applied to an exposed end of a first conductive line 710. The one or more contact pads 751,752 may provide a location for electrically connecting the backplane to the light-transmissive front electrode (not shown) of the display. Finally, a layer of resistive material 760 may be applied over the second plurality of conductive lines 740, such that the layer of resistive material 760 is in electrical contact with the second plurality of conductive lines 740. The layer of resistive material is preferably the top-most layer of the backplane and will be in direct contact with a front plane laminate (FPL) of the display.

Each of the components in the backplane may be easily fabricated using techniques known by those of skill in the art, such as the methods for manufacturing multi-layered printed circuit boards. Various materials may be used for the various layers of the backplane. For example, materials for the insulating layer include, but are not limited to, dielectric materials, preferably, dielectric materials comprising photo-curable solvent free organic or silicone based oligomers. Examples of materials that may be used in the resistive layer include, but are not limited to, resistive carbon, ITO filled polymers, PEDOT filled polymers, and metal fillers. Similarly, any conductive material may be used to print the first and second plurality of conductive lines, such as carbon or conductive metals, like silver, nickel, and copper.

The material for forming the second plurality of conductive lines preferably has a higher conductivity than the material used to form the layer of resistive material. The combination of the second plurality of conductive lines and layer of resistive material essentially provides a series of highly conductive bus bars in which the conductive lines serve as individual bus bars because the resistive material layer ensures uniform voltage around each line. The resistance of the layer of resistive material may be selected relative to the length and spacing between the bus bar lines. Preferably, the total resistance between bus bar lines is greater than or equal to 1 kOhm, more preferably greater than or equal to 10 kOhm for reduced power consumption. For example, in a configuration in which the length to spacing ratio of the bus bar lines is 10, providing a resistive layer having a resistivity of 10 kOhms/square results in a total resistance between the bus bar lines of 1 kOhm.

In another embodiment of the present invention, a method of driving a display having the above-described backplane is provided. To drive the display, a driver with bi-level or tri-level output capability may be used, which also preferably has a floating (high impedance) output capability. Referring again to FIGS. 7A to 7D, the driver may be connected to the first plurality of conductive lines 710 along the left side of the substrate 700. In a first step, the driver may apply voltage to the leftmost bus bar line ("first bus bar line") of the second plurality of conductive lines 740 and short or float the remaining bus bar lines. As used herein throughout the specification and the claims, "short" or "shorting" means to ground a conductive line or area, and "float" or "floating" means to electrically isolate a conductive line or area. The electro-optic media within the FPL that is located in proximity to the leftmost bus bar line will switch immediately and a color gradient from switched to unswitched electro-optic media will appear between the first bus bar line and the subsequent bus bar line ("second bus bar line"). If the driver is capable of pulse width modulated (PWM) or voltage modulated (VM) output, the driver may gradually increase the duty cycle or voltage to create a more slowly developing gradient. After some period of time, the length of which may be determined by the switching speed required by the application, the driver may apply voltage to the second bus bar line, while ending the voltage application on the first bus bar line, and so on. In this manner, the driver may gradually switch the electro-optic media across the entire display in a controlled fashion while limiting the application of voltage to only the area where the gradient between switched and unswitched electro-optic media exists.

If a wider gradient is desired, for example, the driver may apply voltage on multiple adjacent bus bar lines, timed in succession, so as to gradually spread the gradient across the display. Finally, a gradient may be created at any location in the display and multiple gradients may exist simultaneously by applying a pattern of opposing voltages on multiple bus bar lines. The gradient can start and stop at any point on the display or at any time, and if multiple gradients are generated simultaneously, the gradients may propagate in multiple directions at multiple speeds. The wave complexity is therefore dependent on the bus bar line spacing and the software control for the driver.

As explained above, the layer of insulating material between the first and second plurality of conductive lines connects the drive circuit to remote areas of the backplane. The various conductive lines are able to cross each other without electrically shorting each other. This configuration allows for various backplane designs. For example, a backplane having similar printed layers as the previously described rectangular backplane may instead be provided on a circular substrate. Referring to FIGS. 8A to 8D, a circular substrate 800 may include a first plurality of concentric conductive lines 810 having varying lengths printed about a circumferential area of the substrate 800. One end of each of the concentric conductive lines 800 located on an edge of the substrate may connect to a driver (not shown). A layer of insulating material 820 may be coated over the first plurality of conductive lines 810, except for voids 830 that leave the unconnected ends of each of the first conductive lines 810 exposed. A second plurality of conductive lines 840 may then be printed radially on the layer of insulating material 820, such that each radial conducting line 840 is applied over a respective void 830, so that each radial conducting line 840 is in electrical contact with a single concentric conducting line 810. The backplane may also include one or more connection points 851, 852, 853 to electrically connect with a light-transmissive electrode (not shown) of the display. Finally, a layer of resistive material 860 may be applied over the radial conductive lines 840 to form a plurality of radially extending bus bar lines in the circular backplane. During operation, a display having the circular backplane with radially extending bus bar lines would allow for switching the electro-optic media in a circumferential gradient path.

In yet another embodiment of the present invention, a backplane may be provided capable of forming two dimensional color gradient patterns. Referring to FIGS. 9A to 9D, a substrate 900 may include a plurality of generally parallel conductive lines 910. The ends of each of the conductive lines 910 along one edge of the substrate 900 may be connected to a driver (not shown). A layer of insulating material 920 may be applied over the plurality of conductive lines 910, except for voids 930 left to expose the unconnected ends of the conductive lines 910. Next, a plurality of conductive areas 940 may be optionally printed over each of unconnected ends of the plurality of conductive lines. One or more of the conductive areas may serve as connections 951, 952 to electrically connect the backplane with the light-transmissive electrode (not shown) of the display. Finally, a layer of resistive material 960 may be applied over the plurality of conductive areas 940, if present, or the exposed ends of the plurality of conductive lines 910. The conductive areas, if present, or the exposed ends of the plurality of conductive lines in combination with the resistive material will form a plurality of bus bar points. As with the bus bar lines, the bus bar points are preferably separated from each other with sufficient distance to provide a resistance greater than or equal to 1 kOhm. By applying an alternating pattern of voltages from bus bar point to bus bar point, the driver can create color gradients in multiple directions around each point.

From the foregoing, it will be seen that the present invention provides a display and driving method which enables moving changes in the optical state of an electro-optic medium (especially a bistable medium, such as an electrophoretic medium) and generation of patterns of visual interest with very simple, inexpensive electrodes.

It will be apparent to those skilled in the art that numerous changes and modifications can be made in the specific embodiments of the invention described above without departing from the scope of the invention. For example, variable voltages are not, of course, confined to simple sine waves; triangular waves, saw tooth waves and square waves of fixed or varying frequency may all be employed. Accordingly, the whole of the foregoing description is to be interpreted in an illustrative and not in a limitative sense.

The invention claimed is:

1. A display comprising a layer of electro-optic material, and first and second electrodes on opposed sides of the layer of electro-optic material, the first electrode being light-transmissive, and the second electrode having at least two spaced contacts, and voltage control means arranged to vary the potential difference between the two spaced contacts, wherein the second electrode comprises:
a first plurality of conductive lines;
a layer of insulating material comprising a plurality of voids applied over the first plurality of conductive lines;
a second plurality of conductive lines applied to the layer of insulating material; and
a layer of resistive material in electrical contact with the second plurality of conductive lines, and
wherein the layer of insulating material is configured such that within the voids, each conductive trace in the first plurality of conductive lines is electrically connected to a single conductive line in the second plurality of conductive lines and each conductive line in the second plurality of conductive lines to a single conductive line in the first plurality of conductive lines.

2. A display according to claim 1 wherein the electro-optic material comprises a rotating bichromal member, electrochromic or electro-wetting material.

3. A display according to claim 1 wherein the electro-optic material comprises an electrophoretic material comprising a plurality of electrically charged particles disposed in a fluid and capable of moving through the fluid under the influence of an electric field.

4. A display according to claim 3 wherein the electrically charged particles and the fluid are confined within a plurality of capsules or microcells.

5. A display according to claim 3 wherein the electrically charged particles and the fluid are present as a plurality of discrete droplets surrounded by a continuous phase comprising a polymeric material.

6. A display according to claim 1, wherein at least one of the first and second set of conductive lines comprises a conductive material selected from the group consisting of silver, nickel, copper, and carbon.

7. A display according to claim 1, wherein the resistive material comprises one or more of an ITO filled polymer, a PEDOT filled polymer, and carbon.

8. A display according to claim 1, wherein a total resistance between adjacent lines of the second plurality of conductive lines is at least 1 kOhm.

9. A display according to claim 1, wherein a total resistance between adjacent lines of the second plurality of conductive lines is at least 10 kOhms.

10. A display according to claim 1, wherein each of the conductive lines in the second plurality are configured to operate as a bus bar.

11. A method of driving an electro-optic display according to claim 1 comprising applying voltage to at least one of the second plurality of conductive lines while simultaneously shorting or floating at least one of the remaining second plurality of conductive lines.

12. A display comprising a layer of electro-optic material, and first and second electrodes on opposed sides of the layer of electro-optic material, the first electrode being light-transmissive, and the second electrode having at least two spaced contacts, and voltage control means arranged to vary the potential difference between the two spaced contacts, wherein the second electrode comprises:
a plurality of conductive lines;
a layer of insulating material applied over the plurality of conductive lines, except for an end of each of the conductive lines;
a layer of resistive material in electrical contact with the end of each of the conductive lines, and
a plurality of conductive areas between the end of each of the conductive lines and the layer of resistive material,
wherein each conductive line in the plurality of conductive lines is electrically connected to a single conductive area and each conductive area to a single conductive line.

13. A display according to claim 12, wherein at least one of the plurality of conductive lines and areas comprises silver.

14. A display according to claim 12, wherein the resistive material comprises carbon.

15. A display according to claim 12, wherein a total resistance between the ends of adjacent conductive lines is at least 1 kOhm.

16. A display according to claim 12, wherein a total resistance between the ends of adjacent conductive lines is at least 10 kOhms.

17. A display according to claim 12, wherein each of the ends of the conductive lines is configured to operate as a bus bar.

18. A method of driving an electro-optic display according to claim 12 comprising applying voltage to at least one of the first plurality of conductive lines while simultaneously shorting or floating at least one of the remaining second plurality of conductive lines.

* * * * *